US012172215B2

(12) United States Patent
Robertson et al.

(10) Patent No.: US 12,172,215 B2
(45) Date of Patent: Dec. 24, 2024

(54) TECHNIQUES FOR FORMING POLYCRYSTALLINE, SUPERABRASIVE MATERIALS, AND RELATED METHODS AND CUTTING ELEMENTS FOR EARTH-BORING TOOLS

(71) Applicant: Baker Hughes Oilfield Operations LLC, Houston, TX (US)

(72) Inventors: Andrew Robertson, The Woodlands, TX (US); Marc Bird, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 965 days.

(21) Appl. No.: 17/172,998

(22) Filed: Feb. 10, 2021

(65) Prior Publication Data

US 2021/0245244 A1    Aug. 12, 2021

Related U.S. Application Data

(60) Provisional application No. 62/972,555, filed on Feb. 10, 2020.

(51) Int. Cl.
*B22F 7/06* (2006.01)
*B22F 5/00* (2006.01)
(Continued)

(52) U.S. Cl.
CPC ............... *B22F 7/06* (2013.01); *B22F 5/00* (2013.01); *B22F 9/04* (2013.01); *E21B 10/567* (2013.01);
(Continued)

(58) Field of Classification Search
CPC ..................... E21B 10/567; B22F 2005/001
See application file for complete search history.

(56) References Cited

U.S. PATENT DOCUMENTS 4,797,241 A    1/1989  Peterson et al.
8,151,911 B1   4/2012  Miess
(Continued)

FOREIGN PATENT DOCUMENTS

CA    2639727 A1 *  4/2009  ............ B22F 3/1039
EP    2032243 B1      1/2014
(Continued)

OTHER PUBLICATIONS

International Search Report for International Application No. PCT/US2021/017466 dated Nov. 17, 2021, 4 pages.
(Continued)

*Primary Examiner* — Jennifer S Matthews
(74) *Attorney, Agent, or Firm* — Baker Hughes Company

(57) ABSTRACT

Methods of making cutting elements for earth-boring tools may involve intermixing discrete particles of superabrasive material with a binder material in a solvent to form a slurry. The slurry may be vacuum dried or spray dried to disaggregate individual precursor agglomerates including a group of discrete particles suspended in a discrete quantity of the binder material from one another. The precursor agglomerates may be sintered while exposing the precursor agglomerates to a quantity of catalyst material to form agglomerates including discrete quantities of polycrystalline, superabrasive material while inhibiting formation of inter-granular bonds among the agglomerates themselves. The agglomerates may subsequently be sintered while exposing the agglomerates to another quantity of catalyst material to form a table for the cutting element including inter-granular bonds among adjacent grains of the agglomerates.

17 Claims, 6 Drawing Sheets

(51) Int. Cl.
*B22F 9/04* (2006.01)
*E21B 10/567* (2006.01)

(52) U.S. Cl.
CPC ... *B22F 2005/001* (2013.01); *B22F 2009/043* (2013.01); *B22F 2302/406* (2013.01)

(56) References Cited

U.S. PATENT DOCUMENTS

| | | | | |
|---|---|---|---|---|
| 8,771,391 | B2 * | 7/2014 | DiGiovanni | C04B 35/528 |
| | | | | 51/307 |
| 9,889,540 | B2 | 2/2018 | Bird et al. | |
| 10,066,441 | B2 | 9/2018 | Chakraborty et al. | |
| 10,829,999 | B2 * | 11/2020 | Gledhill | C22B 23/0407 |
| 2009/0152015 | A1 | 6/2009 | Sani et al. | |
| 2012/0067652 | A1 * | 3/2012 | Bellin | E21B 10/5735 |
| | | | | 175/433 |
| 2012/0103696 | A1 * | 5/2012 | DiGiovanni | E21B 10/55 |
| | | | | 175/425 |
| 2012/0211284 | A1 * | 8/2012 | DiGiovanni | C04B 35/52 |
| | | | | 175/428 |
| 2013/0168159 | A1 * | 7/2013 | Eyre | B22F 3/14 |
| | | | | 51/307 |
| 2019/0061004 | A1 * | 2/2019 | Khabashesku | B22F 7/06 |
| 2020/0361000 | A1 * | 11/2020 | Thakare | B22F 3/14 |

FOREIGN PATENT DOCUMENTS

| | | | | |
|---|---|---|---|---|
| GB | 2408735 A | * | 6/2005 | .............. B01J 3/065 |
| JP | 2004517206 A | * | 6/2004 | |
| WO | WO-2016099798 A1 | * | 6/2016 | ................ B22F 3/14 |

OTHER PUBLICATIONS

International Written Opinion for International Application No. PCT/US2021/017466 dated Nov. 17, 2021, 5 pages.

* cited by examiner

TECHNIQUES FOR FORMING POLYCRYSTALLINE, SUPERABRASIVE MATERIALS, AND RELATED METHODS AND CUTTING ELEMENTS FOR EARTH-BORING TOOLS

CROSS-REFERENCE TO RELATED APPLICATION

This application claims the benefit under 35 U.S.C. § 119(e) of U.S. Provisional Patent Application Ser. No. 62/972,555, filed Feb. 10, 2020, for, "TECHNIQUES FOR FORMING POLYCRYSTALLINE, SUPERABRASIVE MATERIALS, AND RELATED METHODS, MATERIALS, CUTTING ELEMENTS, AND EARTH-BORING TOOLS," the disclosure of which is incorporated herein in its entirety by this reference.

FIELD

This disclosure relates generally to techniques for forming polycrystalline, superabrasive agglomerates for use in earth-boring tools and their components, as well as other industrial applications, and related methods, cutting elements, and earth-boring tools. More specifically, disclosed embodiments relate to techniques for forming polycrystalline, superabrasive agglomerates for use in earth-boring tools that may be easier to produce, exhibit desirable size and shape characteristics, and configured to better balance performance characteristics when incorporated into a larger mass of polycrystalline material, such as, for example, a table of a cutting element.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit.

The cutting elements used in such earth-boring tools often include polycrystalline diamond compact (often referred to as "PDC") cutting elements, also termed "cutters," which are cutting elements that include a polycrystalline diamond (PCD) material, which may be characterized as a superabrasive or superhard material. Such polycrystalline diamond materials are formed by sintering and bonding together relatively small synthetic, natural, or a combination of synthetic and natural diamond grains or crystals, termed "grit," under conditions of high temperature and high pressure in the presence of a catalyst, such as, for example, cobalt, iron, nickel, or alloys and mixtures thereof, to form a layer of polycrystalline diamond material, also called a diamond table. These processes are often referred to as high temperature/high pressure ("HTHP") processes. The cutting element substrate may comprise a cermet material, i.e., a ceramic-metal composite material, such as, for example, cobalt-cemented tungsten carbide. In some instances, the polycrystalline diamond table may be formed on the cutting element, for example, during the HTHP sintering process. In such instances, cobalt or other catalyst material in the cutting element substrate may be swept into the diamond grains or crystals during sintering and serve as a catalyst material for forming a diamond table from the diamond grains or crystals. Powdered catalyst material may also be mixed with the diamond grains or crystals prior to sintering the grains or crystals together in an HTHP process. In other methods, however, the diamond table may be formed separately from the cutting element substrate and subsequently attached thereto.

BRIEF SUMMARY

In some embodiments, methods of making cutting elements for earth-boring tools may involve intermixing discrete particles of superabrasive material with a binder material in a solvent to form a slurry. The slurry may be vacuum dried or spray dried to disaggregate individual precursor agglomerates including a group of discrete particles suspended in a discrete quantity of the binder material from one another. The precursor agglomerates may be sintered while exposing the precursor agglomerates to a quantity of catalyst material to form agglomerates including discrete quantities of polycrystalline, superabrasive material while inhibiting formation of inter-granular bonds among the agglomerates themselves. Optionally, the agglomerates may subsequently be sintered while exposing the agglomerates to another quantity of catalyst material to form a table for the cutting element including inter-granular bonds among adjacent grains of the agglomerates.

In other embodiments, cutting elements for earth-boring tools may include a substrate and a table supported on an end of the substrate. The table may include a polycrystalline, superabrasive material and a filler material located in interstitial spaces among interbonded grains of the polycrystalline, superabrasive material. The polycrystalline, superabrasive material may include concentrated agglomerates of interbonded grains of the superabrasive material, interbonding between adjacent agglomerates, and interstitial spaces among the agglomerates sized and shaped as though individual grains of the superabrasive material having a same size and shape as the agglomerates defined the interstitial spaces.

BRIEF DESCRIPTION OF THE DRAWINGS

While this disclosure concludes with claims particularly pointing out and distinctly claiming certain embodiments within the scope of this disclosure, various features and advantages of illustrative embodiments also within the scope of this disclosure are discussed below with reference to the accompanying figures, in which:

DETAILED DESCRIPTION

Figure 1:
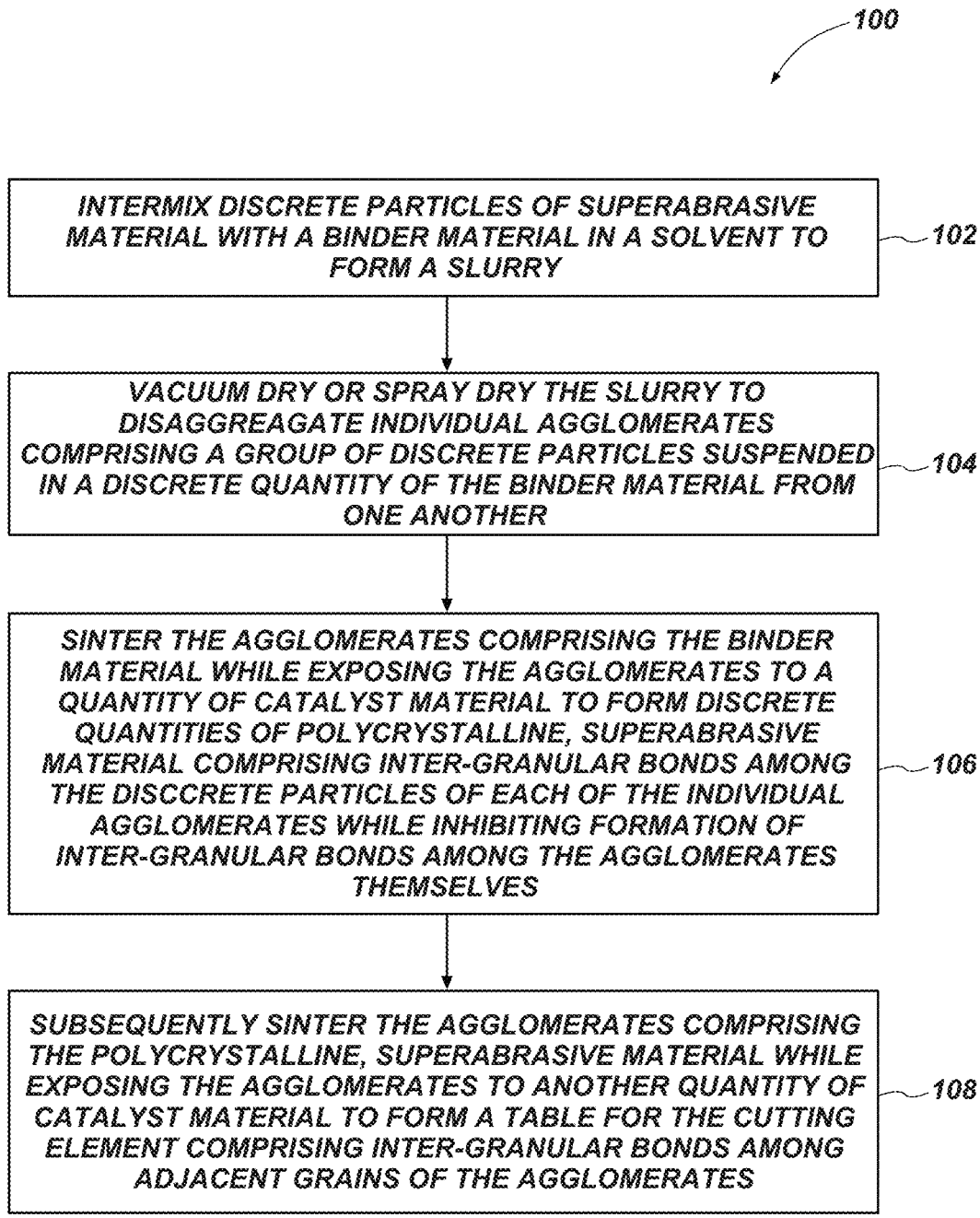
FIG. 1 is a flow chart of a method of making polycrystalline, superabrasive agglomerates and incorporating the agglomerates into a cutting element for an earth-boring tool.

The illustrations presented in the figures are not meant to be actual views of any particular polycrystalline, superabrasive material, cutting element, earth-boring tool, or component thereof, but are merely idealized representations employed to describe illustrative embodiments. Thus, the drawings are not necessarily to scale.

Disclosed embodiments relate generally to techniques for forming polycrystalline, superabrasive agglomerates for use in earth-boring tools that may be easier to produce, exhibit desirable size and shape characteristics, and be configured to better balance performance characteristics when incorporated into a larger mass of polycrystalline material, such as, for example, a table of a cutting element. More specifically, disclosed are embodiments of methods of making tables for cutting elements for earth-boring tools that may involve two sintering processes: a first sintering process to form agglomerates including polycrystalline, superabrasive material and a second sintering process to interbond the agglomerates and form a larger mass of polycrystalline, superabrasive material. The larger mass of polycrystalline, superabrasive material may be characterized by, for example, small average grain sizes for individual grains of the polycrystalline, superabrasive material, small bond lengths between adjacent, interbonded grains of the polycrystalline, superabrasive material, and large interstitial regions among interbonded agglomerates including multiple interbonded grains of the superabrasive material in a cluster. The resulting polycrystalline, superabrasive material may have higher fracture strength, higher fracture toughness, higher abrasion resistance, higher resistance to crack propagation, or any combination or subcombination of these properties when compared to other polycrystalline, superabrasive materials known to the inventors.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

As used herein, the term "earth-boring tool" means and includes any type of bit or tool used for drilling during the formation or enlargement of a wellbore in a subterranean formation. For example, earth-boring tools include fixed-cutter bits, roller cone bits, percussion bits, core bits, eccentric bits, bicenter bits, reamers, mills, drag bits, hybrid bits (e.g., bits including rolling components in combination with fixed cutting elements), and other drilling bits and tools known in the art.

As used herein, the term "superabrasive material" means and includes any material having a Knoop hardness value of about 3,000 Kgf/mm2 (29,420 MPa) or more. Superabrasive materials include, for example, diamond and cubic boron nitride. Superabrasive materials may also be referred to as "superhard" materials.

As used herein, the term "polycrystalline material" means and includes any structure comprising a plurality of grains (i.e., crystals) of material that are bonded directly together by inter-granular bonds. The crystal structures of the individual grains of the material may be randomly oriented in space within the polycrystalline material.

As used herein, the terms "inter-granular bond" and "interbonded" mean and include any direct atomic bond (e.g., covalent, metallic, etc.) between atoms in adjacent grains of superabrasive material.

As used herein, terms of relative positioning, such as "above," "over," "under," and the like, refer to the orientation and positioning shown in the figures. During real-world formation and use, the structures depicted may take on other orientations (e.g., may be inverted vertically, rotated about any axis, etc.). Accordingly, the descriptions of relative positioning must be reinterpreted in light of such differences in orientation (e.g., resulting in the positioning structures described as being located "above" other structures underneath or to the side of such other structures as a result of reorientation).

FIG. 1 is a flow chart of a method 100 of making polycrystalline, superabrasive agglomerates in accordance with this disclosure and incorporating the agglomerates into a cutting element for an earth-boring tool. The method 100 may involve intermixing discrete particles of superabrasive material with a binder material in a solvent to form a slurry, as indicated at act 102. For example, the discrete particles of superabrasive material may include discrete grains of the superabrasive material in the form of a powder (e.g., grit). More specifically, the discrete particles of superabrasive material may include diamond grit. An average particle size of the discrete particles may be fine. For example, the average particle size of the discrete particles may be less than about 30 microns. More specifically, the average particle size of the discrete particles may be between about 500 nanometers and about 20 microns. As a specific, nonlimiting example, the average particle size of the discrete particles may be between about 1 micron and about 10 microns (e.g., about 5 microns, about 6 microns, about 7 microns, about 8 microns).

The discrete particles may be intermixed with the binder material by, for example, powder milling the agglomerates with the binder material. More specifically, the discrete particles may be powder milled with a quantity of catalyst material in a solvent. The catalyst material may be configured to catalyze formation of intergranular bonds among grains of the superabrasive material of the particles and may include, for example, a metal-solvent catalyst (e.g., cobalt, nickel, iron, mixtures or alloys including these). The catalyst material may constitute, for example, between about 5% and about 25% (e.g., about 10%) by weight of the contents of the powder mill. The solvent may include, for example, isopropyl alcohol, acetone, hexane, or heptane. In some embodiments, the discrete particles, binder material, and solvent may also be powder milled with a wax material. The wax material may include, for example paraffin wax or polyethylene glycol (PEG). The wax material may constitute, for example, between about 1% and about 5% (e.g., about 2%) by weight of the contents of the powder mill. The resultant output of intermixing may be, for example, a slurry including the discrete particles at least partially coated with the binder material including the catalyst material and any wax material, all of which may be suspended within the solvent.

The slurry may be vacuum dried or spray dried to disaggregate individual precursor agglomerates comprising a group of discrete particles at least partially coated with a discrete quantity of the binder material from one another, as shown at act 104. The resulting, disaggregated precursor agglomerates may include, for example, limited quantities of discrete, fine grains of the superabrasive material surrounded by and suspended within the binder material including the catalyst material and any wax material. The disaggregated precursor agglomerates may also have few sharp edges and irregular shapes. For example, the precursor agglomerates may have an at least substantially ovoid (e.g., spherical, ellipsoid, rotated obround, pear) shape.

In some embodiments, the precursor agglomerates may be filtered into a predetermined average size grouping after the precursor agglomerates have been disaggregated from one another. Filtering may be accomplished by, for example, passing the agglomerates through a mesh having openings of a predetermined size. An average size of the precursor agglomerates may be, for example, about 5 mm or less. More specifically, the average diameter of the precursor agglomerates may be, for example, between about 10 microns and about 5 mm. As a specific, nonlimiting example, the average size of the precursor agglomerates may be, for example, between about 20 microns and about 1 mm (e.g., about 50 microns, about 100 microns, about 250 microns, about 500 microns, about 750 microns). An average number of discrete particles of the superabrasive material within a given precursor agglomerate may be, for example, between about 3 and about 20. More specifically, the average number of discrete particles of the superabrasive material within a given precursor agglomerate may be, for example, between about 4 and about 10. As a specific, nonlimiting example, the average number of discrete particles of the superabrasive material within a given agglomerate may be between about 5 and about 7.

The precursor agglomerates including the binder material may be sintered while exposing the precursor agglomerates to a quantity of catalyst material to form agglomerates including a polycrystalline, superabrasive material, as shown at act 106. More specifically, sintering may produce, for example, discrete quantities of polycrystalline, superabrasive material in each agglomerate comprising intergranular bonds among the discrete particles of each of the individual agglomerates while inhibiting formation of intergranular bonds among the agglomerates themselves. The agglomerates may be placed, for example, in a container (e.g., that shown in FIG. 2 or a similar container) intermixed with another quantity of catalyst material in the form of a powder. In some embodiments, quantities of graphite may also be introduced into the container to reduce the likelihood that a given discrete particle may shrink and/or dissolve into the catalyst material when the catalyst material is in a molten state.

In other embodiments, the agglomerates may be intermixed with a pressure-transmission medium before introducing the agglomerates into a container and sintering the agglomerates. The pressure transmission medium may serve to transmit pressure to the agglomerates, maintain distancing between agglomerates so as to reduce the likelihood that distinct agglomerates may interbond with one another, and be configured not to significantly alter the size and shape of the agglomerates during interbonding of the grains that form the agglomerates themselves. The pressure transmission medium may have a bulk modulus of, for example, between 100 GPa and 500 GPa, which may facilitate resulting high density of the agglomerates upon sintering. The pressure transmission medium may be configured to remain solid (i.e., not to melt) during sintering (e.g., during an HPHT process).

The agglomerates may be, for example, intermixed with, and at least substantially randomly distributed among grains of, a fine powder of a superabrasive material. More specifically, the agglomerates may be intermixed with, and at least substantially homogeneously distributed among, grains of the same superabrasive material as the superabrasive material of the agglomerates, but having an average particle size of 10% the average size of the agglomerates or smaller. As a specific, nonlimiting example, the agglomerates may be intermixed with a diamond powder having an average particle size of between about 10 nm and about 1 micron (e.g., about 0.05 micron, about 0.1 micron, about 0.5 micron, about 0.7 micron).

The material used for the pressure transmission medium may be sourced, for example, from what might typically be considered waste product from the process used to form the individual grains that are located within the agglomerates in some embodiments. For example, the material used for the pressure transmission medium may be those grains of superabrasive material that are too small to be included in batches of grains having larger average particle sizes, corresponding to a specific mesh sieve or range of mesh sieves. More specifically, the material used for the pressure transmission medium may be sourced from the smallest grains produced by crushing or milling (e.g., jet milling) superabrasive material (e.g., diamond, cubic boron nitride) to produce superabrasive grit, which may often be a waste product (e.g., a material sometimes called "diamond dust" when diamond is the superabrasive material). Accordingly, pressure transmission mediums in accordance with this disclosure may make beneficial use of what may otherwise be a waste product. In still other embodiments, the pressure transmission medium may include a powder of a hard material, such as, for example, particles of tungsten carbide having appropriate average particle sizes.

The small size of the individual particles of the pressure transmission medium may inhibit flow of molten catalyst material from within the agglomerates into the pressure transmission medium. This inhibition of flow of the catalyst material among the particles of the pressure transmission medium may reduce the likelihood that adjacent agglomerates may interbond with one another, the likelihood that the grains of the pressure transmission medium may interbond with one another and/or with a given agglomerate, and the likelihood that the sizes of the agglomerates may change significantly during sintering.

In some embodiments, the agglomerates and/or the particles of the pressure transmission medium may be at least partially coated with a coating material to further reduce the likelihood that catalyst material from within the agglomerates may flow into the pressure transmission medium and to inhibit diffusion of carbon material from within the agglomerates into the pressure transmission medium and vice versa. For example, the agglomerates may be at least partially coated with a metal carbide, metal nitride, or metal carbonitride material. More specifically, the agglomerates may be coated with titanium carbide, titanium nitride, and/or titanium carbonitride (e.g., $Ti(C_X, N_{1-X})$, where X is between 0 and 1). Coating may be achieved by, for example, immersing the precursor agglomerates in a solution including the coating material, mixing the precursor agglomerates with a powder or slurry including the coating material, physical vapor deposition (PVD), chemical vapor deposition (CVD), or milling the precursor agglomerates with a powder or particles of the coating material in such a way as not to alter the size or shape of the precursor agglomerates in a manner other than applying the coating material (e.g., by ball milling with the powder or particles in solution and water as the solvent).

In some embodiments, the intermixed powder, including the precursor agglomerates, any powdered catalyst material, any powdered graphite material, and any pressure transmission medium may be pre-compacted to form a green body prior to introduction into the container. The intermixed powder, in powder or green body form, inside the container may be subjected to a de-waxing treatment prior to the heat and pressure cycle. The de-waxing treatment may be performed in a furnace under vacuum or atmosphere consisting of hydrogen, argon, or a mixture of the two. The de-waxing treatment may be performed between temperatures of about 400° C. and about 900° C., and may last for a period of between about 15 minutes and about 2 hours. The de-waxing treatment may at least partially remove the wax from the intermixed powder or green body.

The previously discrete grains of individual precursor agglomerates may be caused to interbond with one another to form a mass of polycrystalline, superabrasive material of each given agglomerate by heating the precursor agglomerates and the catalyst material under pressure. More specifically, the container, precursor material, and any other contents of the container (e.g., additional quantities of catalyst material, graphite material, pressure transmission media) may be subjected to at least 5 GPa (e.g., up to 8 GPa) of pressure and exposed to at least 1,100° C. (e.g., about 1,200° C., about 1,400° C., about 1,450° C.) in a process sometimes termed a "high-pressure/high-temperature" (HPHT) process. (e.g., in a HPHT process).

Growth of the individual grains of the agglomerates, and interbonding between previously discrete precursor agglomerates themselves, may also be limited by controlling, for example, the concentration of the precursor agglomerates within the container, time at peak temperature and pressure, or both. For example, the superabrasive material of the precursor agglomerates may constitute about 50% or less by weight of the contents of the container in those embodiments where the agglomerates are placed in the container with additional catalyst material and optional graphite material. More specifically, the superabrasive material of the precursor agglomerates may constitute between about 10% and about 45% (e.g., about 35%, about 40%) by weight of the contents of the container in these embodiments.

As another example, the relative quantities of the precursor agglomerates and the pressure transmission medium may be selected to increase the packing density of the precursor agglomerates while reducing the likelihood that adjacent agglomerates will be in contact with one another. More specifically, the agglomerates may occupy about 72.5% by weight of the contents of the container or less, with the pressure transmission medium making up the remainder (about 27.5% by weight or more). As a specific, nonlimiting example, the agglomerates may occupy between about 50% and about 72.5% (e.g., 60%, 70%) by weight of the contents of the container, with the pressure transmission medium and any incidental materials making up the remainder.

In some embodiments, the pressure transmission medium may occupy a volume of the container that is equal to or greater than a percolation threshold for the pressure transmission medium in the container (i.e., a quantity of the pressure transmission medium that ensures continuous connectivity between particles of the pressure transmission medium, and occupation of otherwise empty spaces in the container, while attempting to increase the available space for agglomerates in the container). For purposes of this document, the term "percolation threshold" means PT, as defined by Equation 1 below.

$$P_T = \frac{6P'\left[1 + \left(P'^{(\phi-1)} - 1\right)/14\right]}{(5 + \phi)} \quad \text{Equation 2}$$

wherein PT is the percolation threshold, $\Phi$ is the average aspect ratio (length/width) of the pressure transmission medium, and P' is defined by Equation 2 below.

$$P' = \frac{1.359}{Z} + 0.08 \quad \text{Equation 2}$$

wherein Z represents a coordination packing number calculated using Equation 3 below.

$$V_f = \frac{(Z-2)^2}{\left(Z^2 - 0.6Z + 1.76\right)'} \quad \text{Equation 3}$$

wherein Vf is the volume fraction of the pressure transmission medium in the container. The volume fraction Vf of pressure transmission medium in a container may be determined by analyzing the area fraction of the pressure transmission medium in one or more two-dimensional images of the microstructure of a volume of the container, and then estimating the three-dimensional volume fraction Vf based on the measured two-dimensional area fraction using standard techniques known in the art of microstructural analysis. Thus, once the volume fraction VF is determined from the measured two-dimensional area fraction, Equation 3 above can be solved for the value of Z using standard computational methods. The value of Z then allows calculation of the value of P' from Equation 2 above. The same two-dimensional images of the microstructure used to measure the area fraction of the pressure transmission medium can be analyzed to measure the average aspect ratio 1 (length/width) of the pressure transmission medium. The percolation threshold PT then may be calculated from Equation 3 above using the calculated value of P' and the measured average aspect ratio 1 of the pressure transmission medium.

Although packing of the agglomerates and any other materials (e.g., pressure transmission media, additional catalyst material, graphite material) in the container may seek to maintain separation, and inhibit bonding, between adjacent agglomerates, while increasing packing density, some incidental interbonding between adjacent, previously precursor agglomerates may occur.

An average grain size of the individual grains interbonded with one another within a given agglomerate may be, for example, about 10 microns or less. More specifically, the average grain diameter of the individual grains in the agglomerates may be, for example, between about 2 microns and about 8 microns. As a specific, nonlimiting example, the average grain size of the individual grains forming the agglomerates may be between about 4 microns and about 6 microns. An average size of the agglomerates may be, for example, about 5 mm or less. More specifically, the average diameter of the agglomerates may be, for example, between about 10 microns and about 5 mm. As a specific, nonlimiting example, the average size of the agglomerates may be, for example, between about 20 microns and about 1 mm (e.g., about 50 microns, about 100 microns, about 250 microns, about 500 microns, about 750 microns). An average number of grains of the superabrasive material interbonded with one another to form a given agglomerate may be, for example, between about 3 and about 10. More specifically, the average number of grains of the superabrasive material interbonded with one another to form a given agglomerate may be, for example, between about 4 and about 8. As a specific, nonlimiting example, the average number of grains of the superabrasive material interbonded with one another to form a given agglomerate may be between about 5 and about 7.

The resulting agglomerates may also have fewer sharp edges and irregular shapes than if the agglomerates had been produced by crushing a polycrystalline, superabrasive material into smaller, though still polycrystalline, particles. For example, the agglomerates may have an at least substantially ovoid (e.g., spherical, ellipsoid, rotated obround, pear) shape.

The agglomerates may be removed from the container and the agglomerates may be filtered into a predetermined average size grouping, such as, for example, any of those sizes and utilizing any of those techniques discussed previously in connection with the precursor agglomerates. In embodiments where the agglomerates are sintered with additional quantities of catalyst material and optional graphite material, the agglomerates may be disaggregated by a leaching process (e.g., placement in an acid bath). In those embodiments where a pressure transmission medium is placed in the container with the precursor agglomerates, sintering may cause the particles of the pressure transmission medium to become glass bonded to one another (e.g., by weak, amorphous carbon bonds). In other words, the result of sintering may be a partially sintered (e.g., "brown") part including agglomerates of polycrystalline, superabrasive material bound in a matrix of single-crystalline, glass bonded grains of superabrasive material. Disaggregation may involve milling (e.g., ball milling) the brown part and filtering by size to separate the larger agglomerates from the re-separated grains of the pressure transmission medium. In some embodiments, the pressure transmission medium may be reused.

In some embodiments, at least a portion of the catalyst material used when forming the agglomerates may be removed from the agglomerates. For example, the agglomerates may be exposed to (e.g., submerged within) an acid (e.g., aqua regia), which may dissolve at least a portion of the catalyst material from surfaces and interstitial spaces within the agglomerates in a process typically called "leaching." The resulting agglomerates may be at least substantially free of the catalyst material used to form inter-granular bonds among adjacent grains of superabrasive material in some embodiments. For example, a majority of the catalyst material may be removed, and residual quantities of the catalyst material may remain on one or more surfaces and isolated pockets within the agglomerates not having access to an interconnected network of the interstitial spaces may still include catalyst material therein. In other embodiments, leaching may only remove excessive quantities of the catalyst material from the agglomerates.

In some embodiments, the agglomerates may subsequently be sintered again while exposing the agglomerates to still another quantity of catalyst material to form a table for a cutting element including inter-granular bonds among adjacent grains of the agglomerates, as shown at act 108. For example, the agglomerates may be placed in a container (e.g., that shown in FIG. 2) with a substrate and another quantity of catalyst material (e.g., in the form of a metal matrix of a composite material of the substrate, powdered catalyst material intermixed with the agglomerates, or a foil of catalyst material located adjacent to the agglomerates). Adjacent agglomerates may be caused to interbond with one another to form a larger mass of polycrystalline, superabrasive material of the table by heating the diamond grit and the catalyst material under pressure (e.g., in another HPHT process). In some embodiments, the second sintering process may be carried out in accordance with conventional techniques known to the inventors, using the unconventional agglomerates disclosed herein as input materials.

In some embodiments, the resulting table may be at least partially leached to remove at least a portion of the catalyst material from the interstitial spaces among interbonded grains of the superabrasive material of the agglomerates. As known to the inventors, such leaching or partial leaching may render the table more resilient to changes in temperature that may otherwise introduce stresses due to differences in coefficients of thermal expansion between the polycrystalline, superabrasive material and the catalyst and/or filler material (e.g., may render the table more "thermally stable").

A concentration of the polycrystalline, superabrasive material of the table following the second sintering process may be, for example, between about 85% and about 94% by weight. A concentration of the catalyst material of the table following the second sintering process may be, for example, between about 6% and about 15% by weight.

In other embodiments, the agglomerates produced by the first sintering process may not be subjected to a subsequent sintering process. The agglomerates may be useful as stand-alone particles having a selectable average size, a generally smooth and round shape, and being formed of a polycrystalline, superabrasive material. For example, the agglomerates may be used as milling media, in ball bearings (e.g., as a durable powder lubricant), as an additive for materials in additive manufacturing processes (e.g., for binder jetting, polymer 3D printing), as a particle in a hybrid composite material, as a particle for a hardfacing material, as a particle component of a cladding material, or as a particle additive in any concentrated heat input, high-temperature fusion application.

Figure 2:
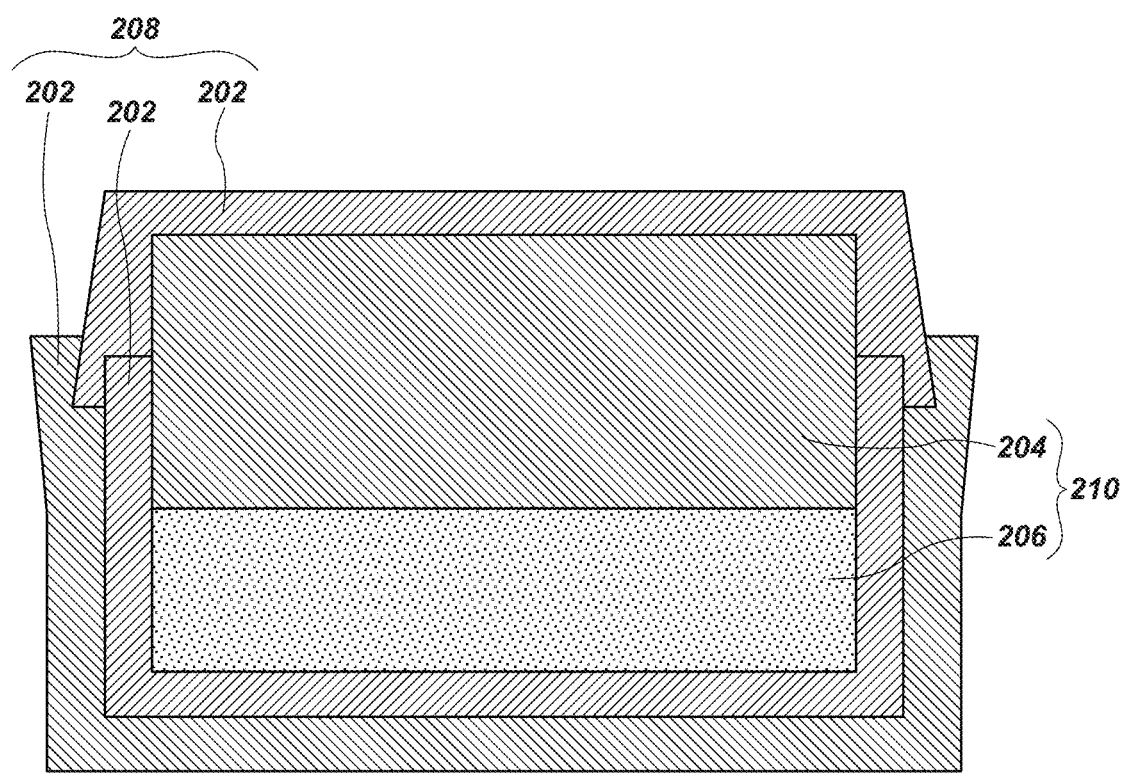
FIG. 2 is a cross-sectional side view of a container for forming cutting elements for earth-boring tools.

FIG. 2 is a cross-sectional side view of a container 202 for forming cutting elements 204 for earth-boring tools. The container 202 may include, for example, two or more cup-shaped member 206 welded and or swaged together to form an internal cavity in which the substrate 208 and precursor materials (e.g., the agglomerates, additional catalyst material) for forming the table 210 may be located. In some embodiments, the precursor materials may also include unbonded particles of the superabrasive material (e.g., diamond grit) intermixed with the agglomerates.

Following the sintering process, the cutting element 204 may include the substrate 208 and a table 210 supported on an end of the substrate 208. The table 210 may include a polycrystalline, superabrasive material and a filler material located in interstitial spaces among interbonded grains of the polycrystalline, superabrasive material. The cutting element 204 depicted in FIG. 2 is generally shaped as a right cylinder, but agglomerates and polycrystalline, superabrasive materials in accordance with this disclosure may be employed to form cutting elements having other shapes known to the inventors, such as, for example, cone tip, tombstone, and chisel.

In other embodiments, and as noted previously, the agglomerates may not be sintered a second time, but may be incorporated into components of earth-boring tools or for other applications in other ways. For example, the agglomerates may be the abrasive particles within an abrasive-impregnated material (e.g., agglomerates dispersed among other particles of a metal-matrix-bound tungsten carbide composite material). Such materials may be useful as, for example, hardfacing materials, cutting inserts, gage pads, bodies of earth-boring tools, and other tools and components known to the inventors.

Figure 3:
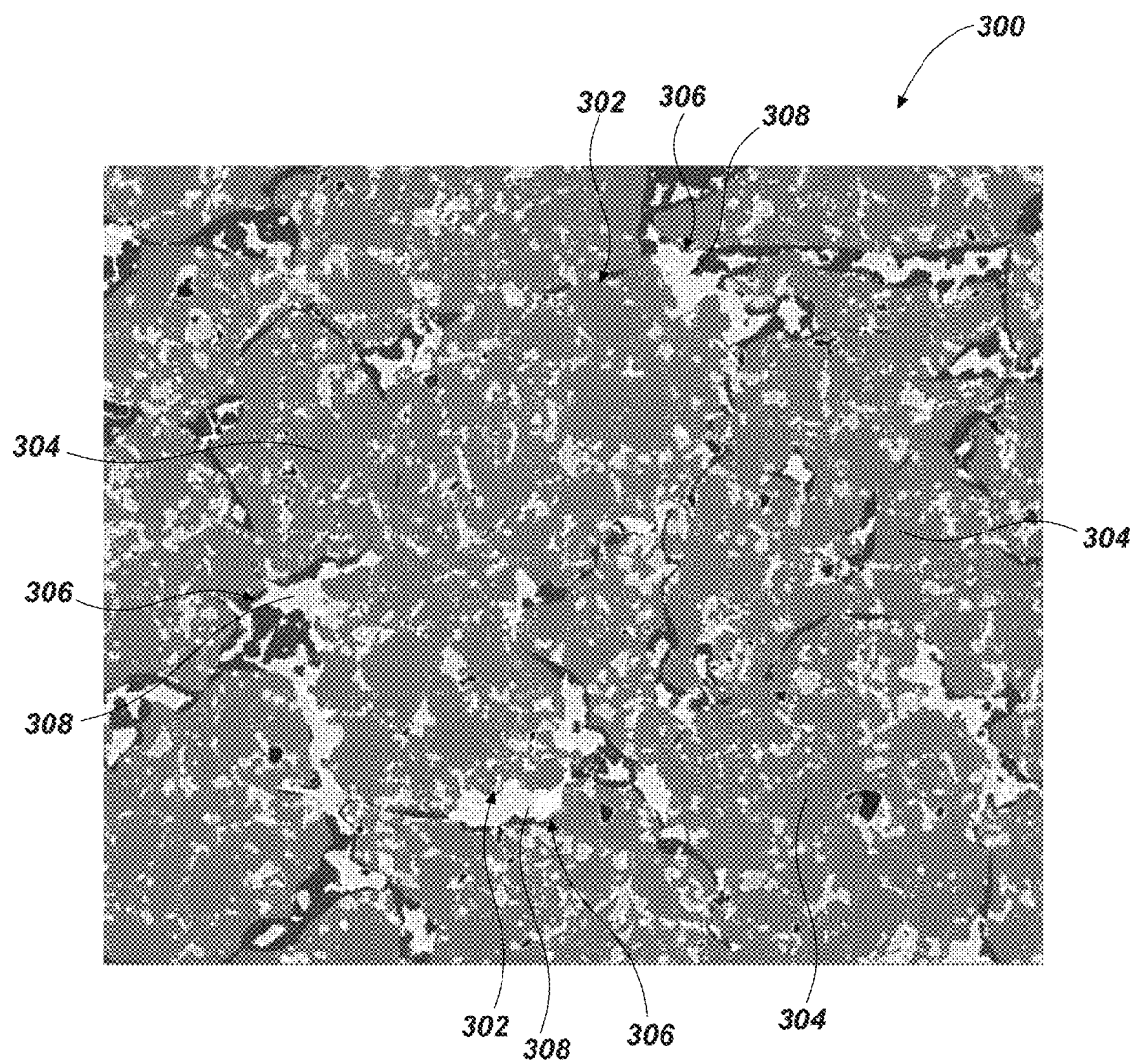
FIG. 3 is a cross-sectional view of how a polycrystalline superabrasive material including agglomerates in accordance with this disclosure may appear under magnification.

FIG. 3 is a cross-sectional view of how a polycrystalline, superabrasive material 300 including agglomerates in accordance with this disclosure may appear under magnification.

Figure 4:
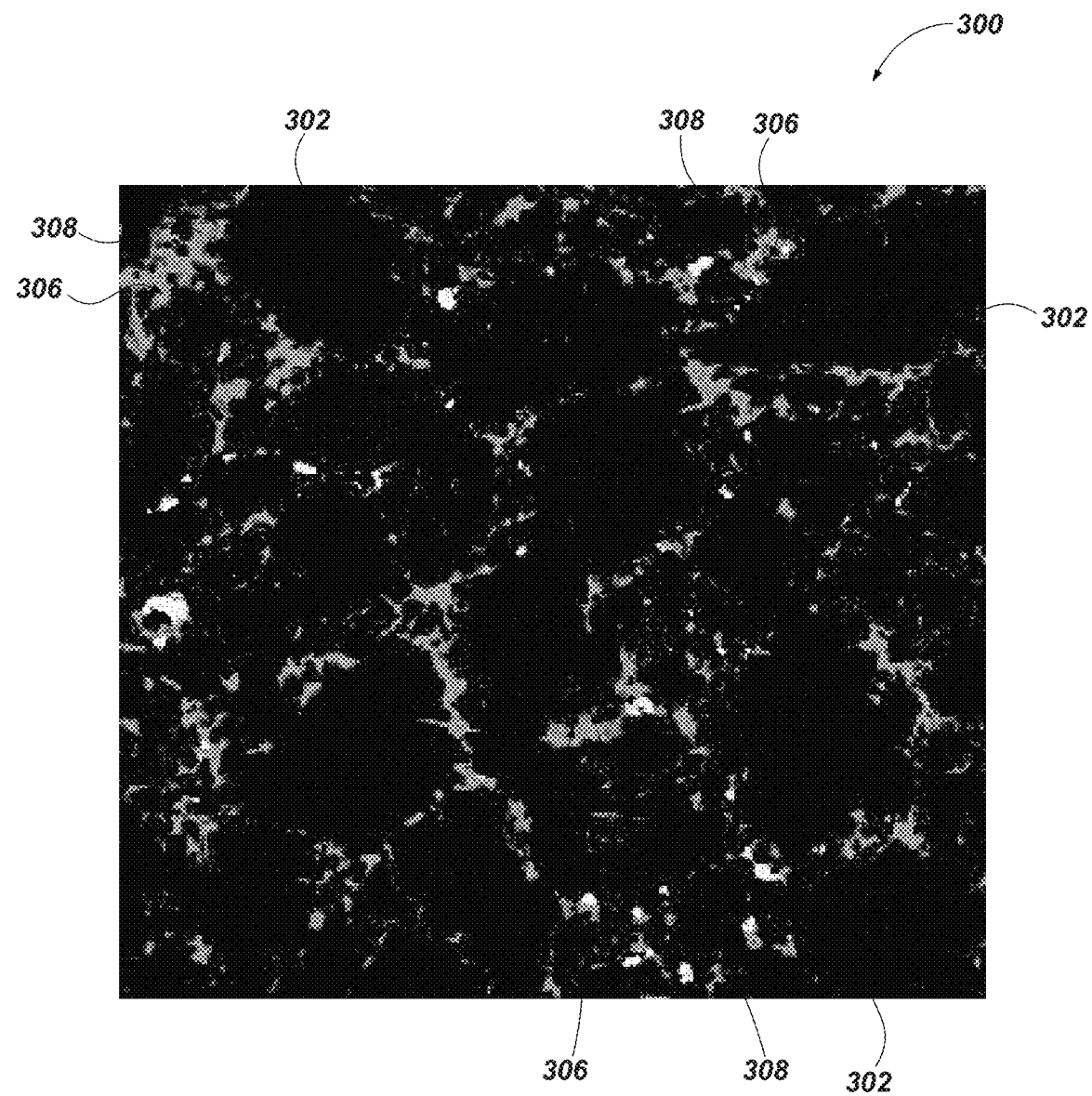
FIG. 4 is a shaded view of FIG. 3 highlighting certain features of the polycrystalline, superabrasive material.

FIG. 4 is a shaded view of FIG. 3 highlighting certain features of the polycrystalline, superabrasive material 300.

Figure 5:
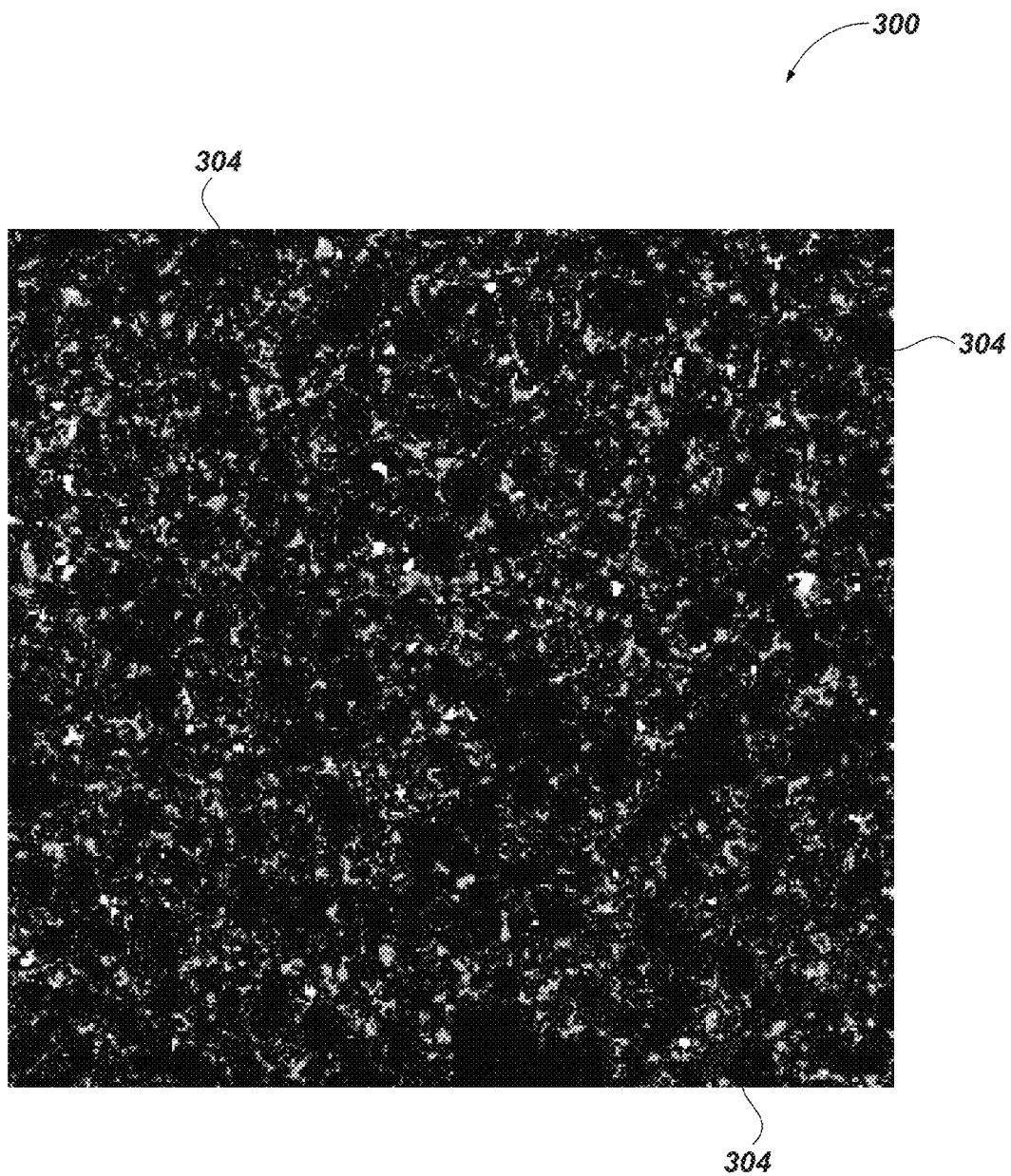
FIG. 5 is another shaded view of FIG. 3 highlighting other features of the polycrystalline, superabrasive material.

FIG. 5 is another shaded view of FIG. 3 highlighting other features of the polycrystalline, superabrasive material 300. With combined reference to FIG. 3, FIG. 4, and FIG. 5, the polycrystalline, superabrasive material 300 may be characterized by concentrated agglomerates 302 of interbonded grains 304 of the superabrasive material, interbonding between adjacent agglomerates 302, and interstitial spaces 306 among the agglomerates 302 sized and shaped as though individual grains of the superabrasive material having a same size and shape as the agglomerates 302 defined the interstitial spaces 306.

As highlighted more particularly in FIG. 4, the agglomerates 302 may produce large clusters concentrating the polycrystalline, superabrasive material 300, with correspondingly large interstitial spaces 306 among the agglomerates 302 in which the catalyst materials 308, or another filler material, may be located. For example, a distribution of the individual grains 304 of the superabrasive material throughout the polycrystalline, superabrasive material 300, and a distribution of the interstitial spaces 306 and the catalyst material 308 located therein throughout the polycrystalline, superabrasive material 300, may not be uniform. More specifically, the microstructure depicted in FIG. 4 may generally resemble, for example, the microstructure that would result from forming the polycrystalline, superabrasive material 300 from grains of the superabrasive material having the same average grain size as the average size of the agglomerates 302.

As highlighted more particularly in FIG. 5, the actual grain size, and the lengths of the bonds between adjacent grains 304, may be small.

By forming the polycrystalline, superabrasive material 300 as disclosed herein (e.g., using a dual sintering process), the resulting material may have higher fracture strength, higher fracture toughness, and higher abrasion resistance than a polycrystalline, superabrasive material formed using a single sintering process. For example, the large regions of catalyst material 308, or other filler material, occupying the interstitial spaces 306 among interbonded agglomerates 302 may better increase fracture strength and fracture toughness when compared to other polycrystalline, superabrasive materials having the same average grain size of interbonded grains of superabrasive material. As another example, the small grains 304 and small bond lengths between adjacent grains 304 may increase abrasion resistance and improve resistance to crack propagation when compared to other polycrystalline, superabrasive materials having larger average grain sizes.

Figure 6:
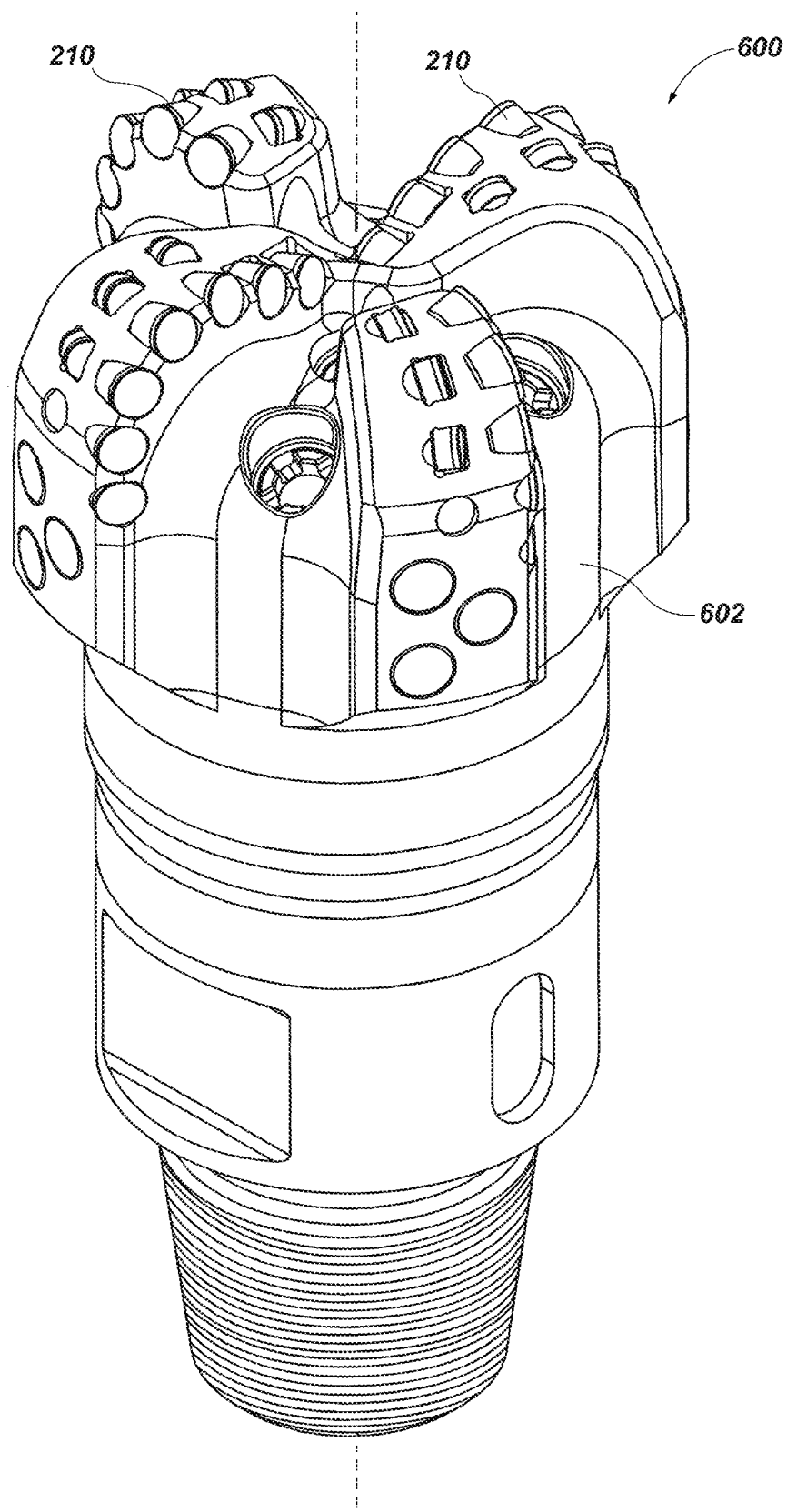
FIG. 6 is a perspective side view of an earth-boring tool including one or more cutting elements having polycrystalline, superabrasive materials in accordance with this disclosure.

FIG. 6 is a perspective side view of an earth-boring tool 600 including one or more cutting elements 204 having polycrystalline, superabrasive materials in accordance with this disclosure. For example, the earth-boring tool 600 may include a body 602 and one or more cutting elements 204 as described previously herein fixedly attached to the body 602 (e.g., brazed within a pocket extending into the body 602). The earth-boring tool 600 depicted in FIG. 6 is configured as a fixed-cutter earth-boring drill bit, but cutting elements 204 including materials in accordance with this disclosure may be deployed on other bits and tools known to the inventors.

Polycrystalline, superabrasive materials including agglomerates formed in accordance with this disclosure may better balance performance characteristics, such as, for example, fracture strength, fracture toughness, abrasion resistance, and resistance to crack propagation, when compared to polycrystalline, superabrasive materials known to the inventors. For example, polycrystalline, superabrasive materials in accordance with this disclosure may include large, concentrated regions of catalyst material, or other filler material, occupying the interstitial spaces among interbonded agglomerates may better increase fracture strength and fracture toughness. More specifically, polycrystalline, superabrasive materials formed in accordance with this disclosure may have larger, concentrated regions of catalyst material than polycrystalline, supabrasive materials formed using conventional techniques known to the inventors having the same average grain size. As another example, the small grains and small bond lengths between adjacent grains may increase abrasion resistance and improve resistance to crack propagation. More specifically, polycrystalline, superabrasive materials formed in accordance with this disclosure may have smaller average grain size and shorter average bond lengths than polycrystalline, supabrasive materials formed using conventional techniques known to the inventors having the same average mean free path through interstitial spaces and/or the same density of superabrasive material.

In addition, agglomerates formed in accordance with this disclosure may have a selectable average size spanning a range of desirable average sizes, more consistent shapes and smoother exterior surfaces, and higher fracture strength, fracture toughness, and resistance to crack propagation when compared to other particles of superabrasive materials in similar size ranges known to the inventors.

Additional, nonlimiting embodiments within the scope of this disclosure include the following:

Embodiment 1: A method of making a cutting element for an earth-boring tool, comprising: intermixing discrete particles of superabrasive material with a binder material in a solvent to form a slurry; vacuum drying or spray drying the slurry to disaggregate individual agglomerates comprising a group of discrete particles suspended in a discrete quantity of the binder material from one another; and sintering the agglomerates comprising the binder material while exposing the agglomerates to a quantity of catalyst material to form discrete quantities of polycrystalline, superabrasive material comprising inter-granular bonds among the discrete particles of each of the individual agglomerates while inhibiting formation of inter-granular bonds among the agglomerates themselves.

Embodiment 2: The method of Embodiment 1, further comprising subsequently sintering the agglomerates comprising the polycrystalline, superabrasive material while exposing the agglomerates to another quantity of catalyst material to form a table for the cutting element comprising inter-granular bonds among adjacent grains of the agglomerates.

Embodiment 3: The method of Embodiment 1 or Embodiment 2, wherein forming the agglomerates comprises: placing diamond grit and catalyst material within a container; causing diamond grains of the diamond grit to interbond with one another to form the polycrystalline, superabrasive material of the agglomerates when the diamond grains are adjacent to one another by heating the diamond grit and the catalyst material under pressure; and removing the agglomerates from the container and filtering the agglomerates into a predetermined average size grouping to disaggregate the agglomerates from one another.

Embodiment 4: The method of Embodiment 3, further comprising maintaining a concentration of the diamond grit at about 50% by weight or less when evaluated against an entirety of a content of the container.

Embodiment 5: The method of Embodiment 3 or Embodiment 4, further comprising selecting an average particle size of the diamond grit to be about 30 microns or less.

Embodiment 6: The method of Embodiment 1 or Embodiment 2, wherein forming the agglomerates comprises: placing precursor agglomerates comprising clusters of diamond grit and catalyst material intermixed with a pressure transmission medium into a container; causing diamond grains of the diamond grit to interbond with one another to form the polycrystalline, superabrasive material of the agglomerates when the diamond grains are adjacent to one another by heating the diamond grit and the catalyst material under pressure; and removing the agglomerates from the container and disaggregating the agglomerates from one another.

Embodiment 7: The method of Embodiment 6, wherein disaggregating the agglomerates from one another comprises ball milling the agglomerates.

Embodiment 8: The method of Embodiment 6 or Embodiment 7, wherein placing the pressure transmission medium into the container comprises placing a powder of the superabrasive material having an average particle size of 10% the average size of the precursor agglomerates or smaller in the container.

Embodiment 9: The method of Embodiment 8, further comprising maintaining a concentration of the pressure transmission medium at about 27.5% by weight or more when evaluated against an entirety of a content of the container.

Embodiment 10: The method of Embodiment 8 or Embodiment 9, further comprising coating the precursor agglomerates with a coating material before placing the precursor agglomerates into the container.

Embodiment 11: The method of Embodiment 10, wherein coating the precursor agglomerates with the coating material comprises coating the precursor agglomerates with a metal carbide, metal nitride, or metal carbonitride material.

Embodiment 12: The method of any one of Embodiments 1 through 11, further comprising controlling time of exposure to peak temperature and pressure to inhibit growth and interbonding of the agglomerates.

Embodiment 13: The method of Embodiment 12, wherein controlling the time of exposure to peak temperature and pressure to inhibit growth of the agglomerates comprises maintaining an average size of the agglomerates less than 100 microns.

Embodiment 14: The method of any one of Embodiments 1 through 13, wherein intermixing the discrete particles with the binder material comprises powder milling the discrete particles with another quantity of catalyst material.

Embodiment 15: The method of any one of Embodiments 1 through 14, wherein intermixing the discrete particles with the solvent comprises powder milling the discrete particles with isopropyl alcohol, acetone, hexane, or heptane Embodiment 16: The method of any one of Embodiments 1 through 15, further comprising filtering the agglomerates into a predetermined average size grouping before subsequently sintering the agglomerates to form the table for the cutting element.

Embodiment 17: The method of Embodiment 16, wherein filtering the agglomerates into the predetermined average size grouping comprises filtering the agglomerates into an average size of about 5 mm or less.

Embodiment 18: A cutting element for an earth-boring tool, comprising: a substrate; and a table supported on an end of the substrate, the table comprising: a polycrystalline, superabrasive material and a filler material located in interstitial spaces among interbonded grains of the polycrystalline, superabrasive material; wherein the polycrystalline, superabrasive material is characterized by concentrated agglomerates of interbonded grains of the superabrasive material, interbonding between adjacent agglomerates, and interstitial spaces among the agglomerates sized and shaped as though individual grains of the superabrasive material having a same size and shape as the agglomerates defined the interstitial spaces.

Embodiment 19: The cutting element of Embodiment 18, wherein a distribution of the individual grains of the superabrasive material is not uniform.

Embodiment 20: The cutting element of Embodiment 18 or Embodiment 19, wherein a distribution of the interstitial spaces of the superabrasive material is not uniform.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure.

What is claimed is:

1. A method of making a cutting element for an earth-boring tool, comprising:
   intermixing discrete particles of superabrasive material with a binder material in a solvent to form a slurry;
   vacuum drying or spray drying the slurry to disaggregate individual agglomerates comprising a group of discrete particles suspended in a discrete quantity of the binder material from one another; and
   sintering the agglomerates comprising the binder material while exposing the agglomerates to a quantity of catalyst material to form discrete quantities of polycrystalline, superabrasive material comprising inter-granular bonds among the discrete particles of each of the individual agglomerates while inhibiting formation of inter-granular bonds among the agglomerates themselves.

2. The method of claim 1, further comprising subsequently sintering the agglomerates comprising the polycrystalline, superabrasive material while exposing the agglomerates to another quantity of catalyst material to form a table for the cutting element comprising inter-granular bonds among adjacent grains of the agglomerates.

3. The method of claim 1, wherein forming the agglomerates comprises:
   placing diamond grit and catalyst material within a container;
   causing diamond grains of the diamond grit to interbond with one another to form the polycrystalline, superabrasive material of the agglomerates when the diamond grains are adjacent to one another by heating the diamond grit and the catalyst material under pressure; and removing the agglomerates from the container and filtering the agglomerates into a predetermined average size grouping to disaggregate the agglomerates from one another.

4. The method of claim 3, further comprising maintaining a concentration of the diamond grit at about 50% by weight or less when evaluated against an entirety of a content of the container.

5. The method of claim 3, further comprising selecting an average particle size of the diamond grit to be about 30 microns or less.

6. The method of claim 1, wherein forming the agglomerates comprises:
placing precursor agglomerates comprising clusters of diamond grit and catalyst material intermixed with a pressure transmission medium into a container;
causing diamond grains of the diamond grit to interbond with one another to form the polycrystalline, superabrasive material of the agglomerates when the diamond grains are adjacent to one another by heating the diamond grit and the catalyst material under pressure; and
removing the agglomerates from the container and disaggregating the agglomerates from one another.

7. The method of claim 6, wherein disaggregating the agglomerates from one another comprises ball milling the agglomerates.

8. The method of claim 6, wherein placing the pressure transmission medium into the container comprises placing a powder of the superabrasive material having an average particle size of 10% the average size of the precursor agglomerates or smaller in the container.

9. The method of claim 8, further comprising maintaining a concentration of the pressure transmission medium at about 27.5% by weight or more when evaluated against an entirety of a content of the container.

10. The method of claim 8, further comprising coating the precursor agglomerates with a coating material before placing the precursor agglomerates into the container.

11. The method of claim 10, wherein coating the precursor agglomerates with the coating material comprises coating the precursor agglomerates with a metal carbide, metal nitride, or metal carbonitride material.

12. The method of claim 1, further comprising controlling time of exposure to peak temperature and pressure to inhibit growth and interbonding of the agglomerates.

13. The method of claim 12, wherein controlling the time of exposure to peak temperature and pressure to inhibit growth of the agglomerates comprises maintaining an average size of the agglomerates less than 100 microns.

14. The method of claim 1, wherein intermixing the discrete particles with the binder material comprises powder milling the discrete particles with another quantity of catalyst material.

15. The method of claim 1, wherein intermixing the discrete particles with the solvent comprises powder milling the discrete particles with isopropyl alcohol, acetone, hexane, or heptane.

16. The method of claim 1, further comprising filtering the agglomerates into a predetermined average size grouping before subsequently sintering the agglomerates to form a table for the cutting element.

17. The method of claim 16, wherein filtering the agglomerates into the predetermined average size grouping comprises filtering the agglomerates into an average size of about 5 mm or less.

* * * * *